US006866826B2

(12) United States Patent
Moore et al.

(10) Patent No.: US 6,866,826 B2
(45) Date of Patent: Mar. 15, 2005

(54) LARGE MOUTH CENTRIFUGE LABWARE

(75) Inventors: Patrick Q. Moore, Gilroy, CA (US); Christopher L. Stewart, Santa Clara, CA (US)

(73) Assignee: Beckman Coulter, Inc., Fullerton, CA (US)

(*) Notice: Subject to any disclaimer, the term of this patent is extended or adjusted under 35 U.S.C. 154(b) by 295 days.

(21) Appl. No.: 09/751,780

(22) Filed: Dec. 30, 2000

(65) Prior Publication Data

US 2002/0085957 A1 Jul. 4, 2002

(51) Int. Cl.[7] .............................. B01L 3/00; G01N 9/30

(52) U.S. Cl. ........................... 422/102; 422/72; 422/99; 422/101; 436/177; 220/318; 220/324; 215/285

(58) Field of Search ............................ 422/72, 99–104; 436/177; 494/16, 20, 21; 220/324, 318; 215/284–286, 291

(56) References Cited

U.S. PATENT DOCUMENTS

| | | | | | |
|---|---|---|---|---|---|
| 3,556,303 | A | * | 1/1971 | Diebold et al. | 210/377 |
| 3,820,546 | A | * | 6/1974 | Chittenden et al. | 604/129 |
| 4,119,407 | A | * | 10/1978 | Goldstein et al. | 422/58 |
| 4,439,177 | A | | 3/1984 | Conway | 494/20 |
| 4,531,652 | A | * | 7/1985 | Hara | 220/669 |
| 4,585,433 | A | | 4/1986 | Cole | 494/20 |
| 4,822,331 | A | * | 4/1989 | Taylor | 494/16 |
| 5,147,055 | A | * | 9/1992 | Samson et al. | 220/259.2 |
| 5,224,515 | A | * | 7/1993 | Foster et al. | 138/89 |
| 5,316,731 | A | * | 5/1994 | Schrenk et al. | 422/101 |
| 5,361,922 | A | | 11/1994 | Moore et al. | 215/364 |
| 5,395,001 | A | | 3/1995 | Moore | 215/364 |
| 5,397,471 | A | * | 3/1995 | Rodebush et al. | 210/360.1 |
| 5,480,484 | A | * | 1/1996 | Kelley et al. | 118/52 |
| 5,490,830 | A | * | 2/1996 | Lovelady et al. | 494/14 |
| 5,728,038 | A | | 3/1998 | Coffey et al. | 494/16 |
| 5,785,925 | A | * | 7/1998 | U'Ren | 422/72 |
| 5,855,289 | A | * | 1/1999 | Moore | 215/270 |
| 5,899,349 | A | | 5/1999 | Moore | 215/277 |
| 5,901,873 | A | | 5/1999 | Moore | 220/669 |
| RE36,341 | E | * | 10/1999 | Howell | 494/16 |
| 5,961,086 | A | | 10/1999 | Moore et al. | 248/314 |
| 6,062,407 | A | | 5/2000 | Moore | 215/270 |
| 6,085,946 | A | * | 7/2000 | Hirsch et al. | 222/475.1 |
| 6,149,570 | A | * | 11/2000 | Lowe et al. | 494/12 |
| 6,299,038 | B1 | * | 10/2001 | Schmeisser et al. | 222/521 |
| 6,387,030 | B1 | * | 5/2002 | Moore et al. | 494/20 |
| 6,458,067 | B1 | | 10/2002 | Dorin et al. | 494/37 |

FOREIGN PATENT DOCUMENTS

| | | | |
|---|---|---|---|
| WO | WO01 02255 | | 1/2001 |
| WO | WO 02/02735 | * | 1/2002 |

OTHER PUBLICATIONS 2 photographs of a centrifuge labware on sale in the U.S. more than one year prior to the filing of this application.
3 photographs of a centrifuge labware on sale in the U.S. more than one year prior to the filing of this application.
3 photographs of a centrifuge labware, the invention of which predated the filing this application.

* cited by examiner

*Primary Examiner*—Jan M. Ludlow
(74) *Attorney, Agent, or Firm*—William H. May; D. David Hill; Sheldon & Mak, LLP

(57) ABSTRACT

A centrifuge labware includes a container and a removable, non-threaded lid. The container has a top opening which is at least about 90% of the cross-sectional area of the container.

25 Claims, 6 Drawing Sheets

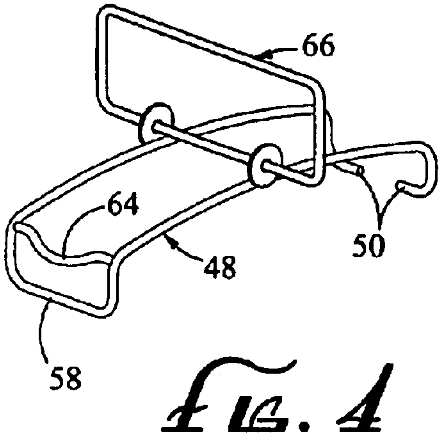
FIG. 4
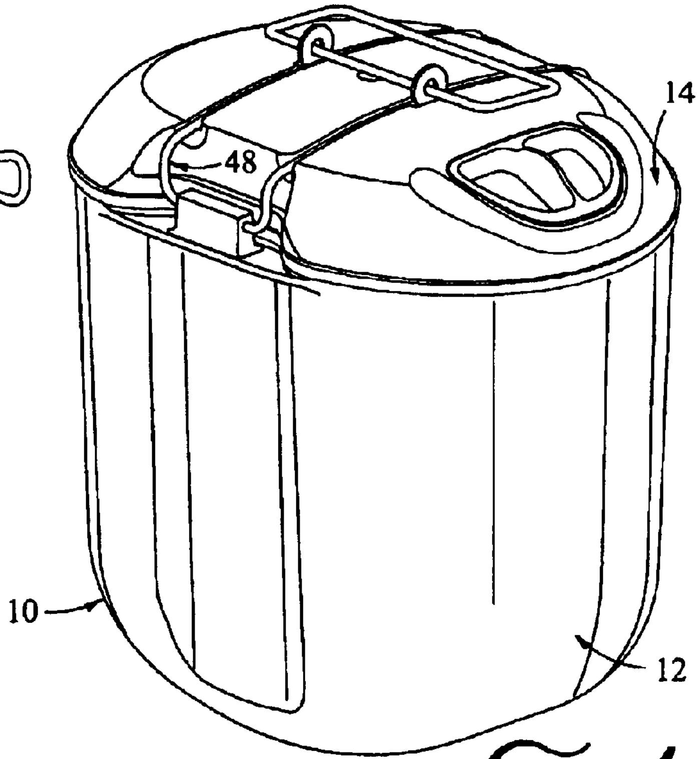
FIG. 1
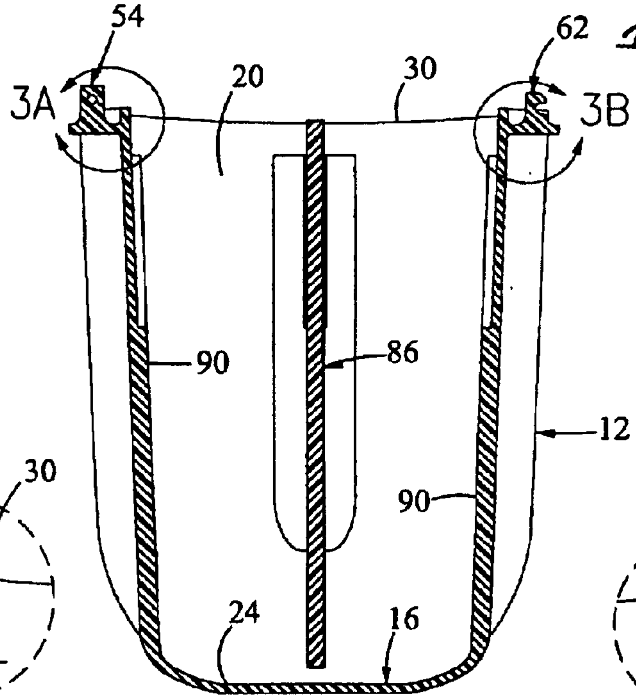
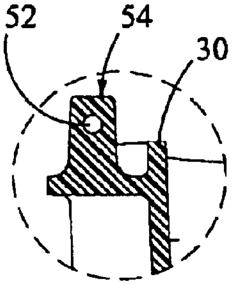
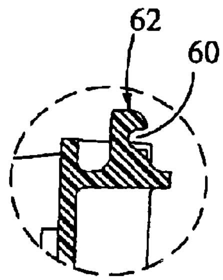
FIG. 3A FIG. 3 FIG. 3B

LARGE MOUTH CENTRIFUGE LABWARE

FIELD OF THE INVENTION

This invention relates generally to centrifuge labware and, more specifically, for large volume centrifuge labware.

BACKGROUND OF THE INVENTION

Centrifuges provide a very common method for separating mixtures in a laboratory setting. Sample mixtures in need of separation are placed in a plurality of individual containers called "centrifuge labware." The samples are then rotated at high speed within the centrifuge until the various components of the mixture are separated by centrifugal force. The most commonly used centrifuges are designed to handle labware of relatively small volume. The labware is typically test tube shaped and the labware is disposed within the centrifuge at a fixed angle with respect to the vertical.

For separating samples of larger volume, swinging bucket centrifuges are employed. Such swinging bucket centrifuges are designed to handle labware having a volume capacity of up to a liter or more. In a swinging bucket centrifuge, the labware is initially retained within hinged buckets, such that the labware is initially retained in a vertical orientation. During operating of the centrifuge, centrifugal forces acting on the bucket cause the buckets to rotate about the hinges outwardly whereby the labware becomes disposed at an angle with respect to the vertical.

Large volume labware is commonly used to grow and eventually harvest genetically engineered bacteria and other simple cellular materials. The bacteria and/or other cellular materials are grown within a nurturing liquid ("broth") disposed within large "fermentors" having a typical capacity of 1–1000 liters. At the end of the growing cycle, a portion of the nurturing liquid is placed into the labware and the labware is then loaded into a swinging bucket centrifuge. In the centrifuge, the labware is rotated at high speed until the biological material is concentrated at the bottom of the labware in a mass commonly termed a "pellet." After separation in the centrifuge, the remaining liquid material ("supernatant") is decanted off and the pellet is "harvested," typically by scraping the pellet off of the bottom of the labware using a spatula or similar tool.

Prior art large volume labware useable in such biotechnical, bioindustrial and biopharmaceutical applications typically are containers having flat bottoms, narrow openings and a screw top lid. There are several problems inherent in such labware. The flat bottoms mean that the junction of the bottom wall with the vertical side walls defines a circumferential edge where it may be difficult to remove the pellet. Moreover, in prior art labware having a non-round cross-section, the junction of the bottom wall with the vertical side walls will also define a plurality of corners from which it can be very difficult to remove pellet material.

In addition, the relatively narrow opening at the top of such prior art labware makes it difficult to remove pellets from the bottom of the labware.

Still further, the screw top lid of such prior art labware does not seal well in the centrifuge. This is because when the centrifuge is operating, the container portion of the labware tends to elongate under the high centrifugal forces. Such elongating of the container portion tends to narrow the top opening and loosens the seal with the screw cap.

Yet another problem with such prior art labware is the relative impossibility of constructing and using a practical liner which will protect the labware and facilitate the cleaning of the labware.

Yet still another problem with such prior art labware is the relative difficulty of decanting off liquid material through the top opening without spilling or dribbling some of the liquid material. Because the liquid material can contain potentially toxic material, this can pose a health risk to laboratory personnel.

Accordingly, there is a need for centrifuge labware which avoids some or all of the aforementioned problems in the prior art.

SUMMARY OF THE INVENTION

The invention satisfies this need. The invention is a centrifuge labware device comprising a container and a lid. The container comprises a bottom wall and one or more substantially vertical sidewalls. The bottom wall and the one or more side walls cooperate to define an interior chamber having an interior chamber cross-sectional area. The container has a top opening defining a top opening open area which is at least about 90% of the interior chamber cross-sectional area. The lid is removable and non-threaded. The lid is sized and dimensioned to cover the top opening so as to seal the interior chamber.

DESCRIPTION OF THE DRAWINGS

These and other features, aspects and advantages of the present invention will become better understood with reference to the following description, appended claims and accompanying drawings where:

FIG. 1 is a perspective view of a centrifuge labware having features of the invention;

FIG. 3 is a half-section view of the container portion of the labware illustrated in FIG. 1;

FIG. 3A is a detailed view of one edge of the container illustrated in FIG. 3, FIG. 3B is a detailed view of a second edge of the container illustrated in FIG. 3;

FIG. 4 is a perspective view of a lid attachment clip and handle useable in the invention;

DETAILED DESCRIPTION

Figure 2:
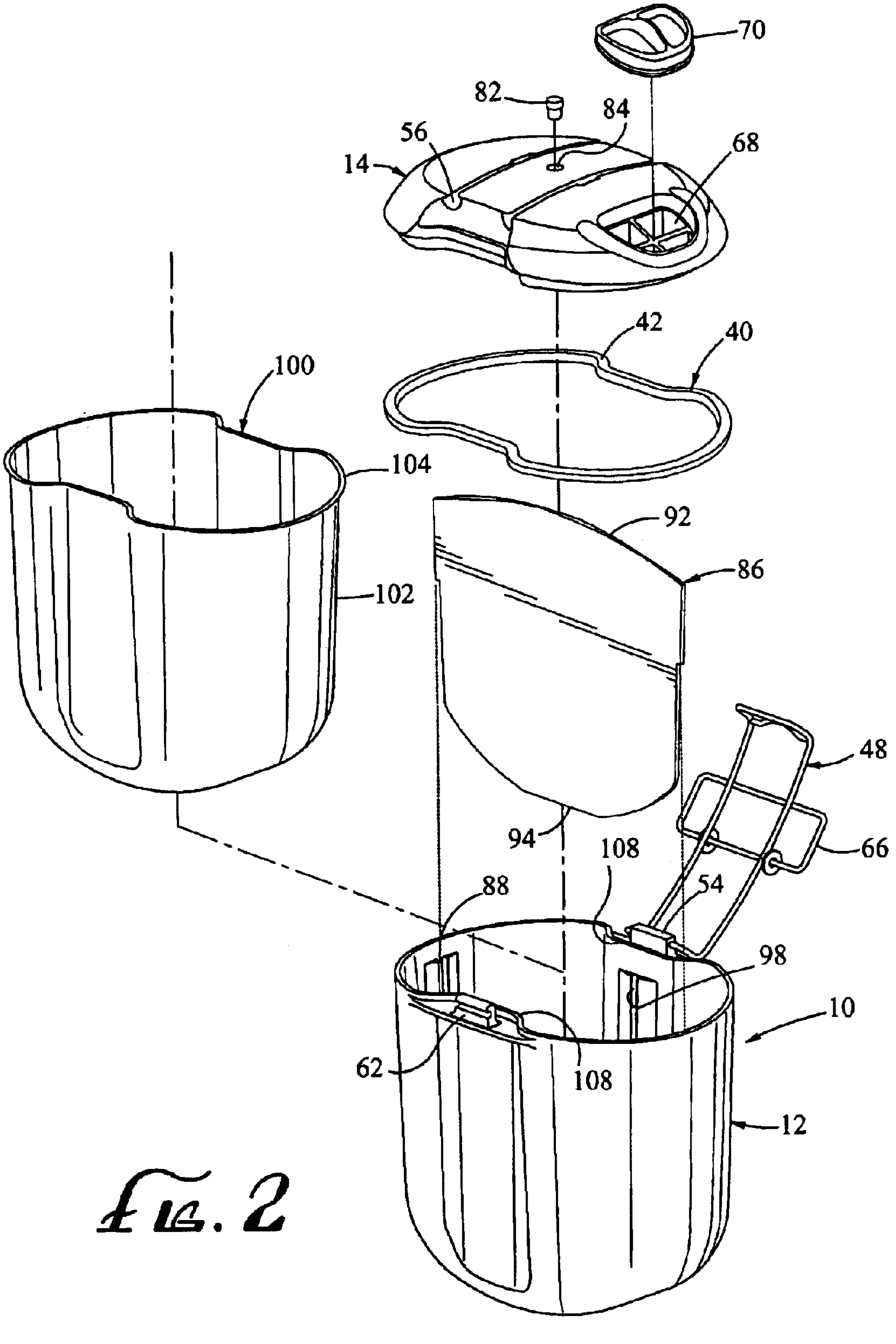
FIG. 2 is an exploded perspective view of the labware illustrated in FIG. 1.
Figure 5:
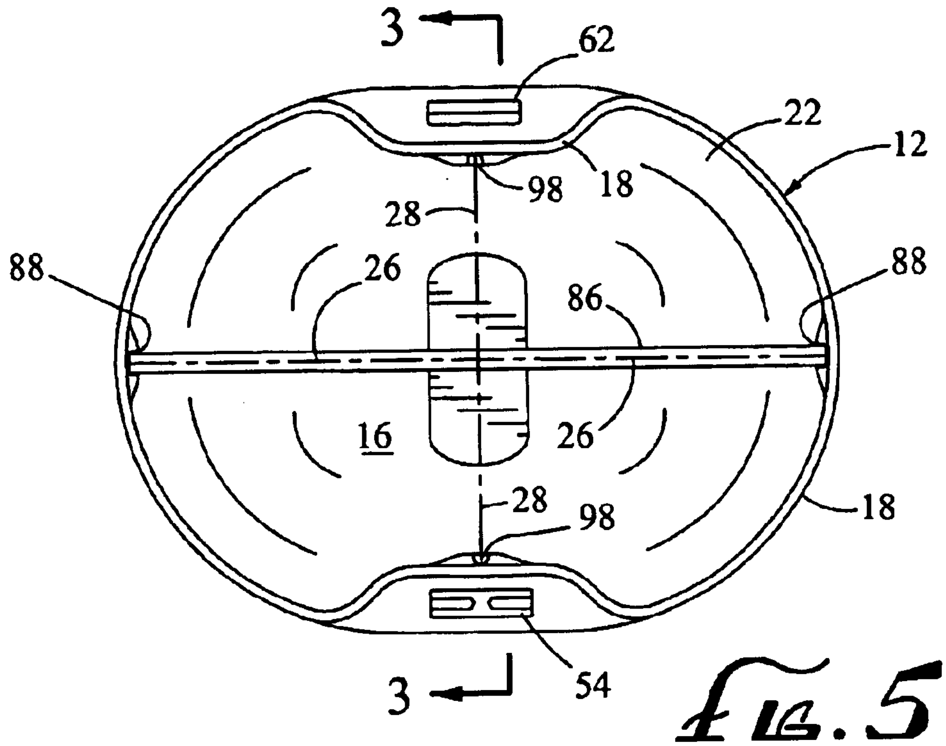
FIG. 5 is a plan view of the container portion illustrated in FIG. 3.
Figure 6:
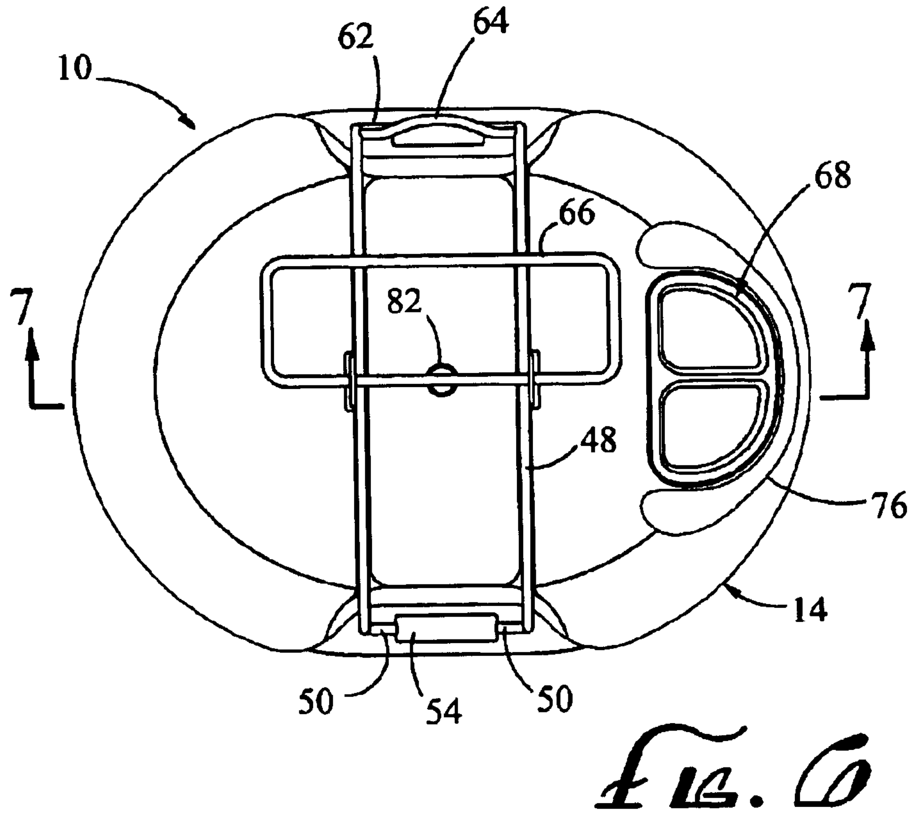
FIG. 6 is a plan view of the labware illustrated in FIG. 1.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a centrifuge labware 10 comprising a container 12 and a lid 14. In the embodiment illustrated in the drawings, the container 12 is a large mouth device comprising a bottom wall 16 and one or more substantially vertical side walls 18. The bottom wall 16 and the one or more side walls 18 cooperate to define an interior chamber 20 with a top opening 22. The container 12 is typically molded from a high strength thermoplastic material, such as a polyphenylsulfone. One such polyphenylsulfone is Radel R1000 marketed by BP Amoco Performance Products of Alphareta, Ga. The container 12 has a very high axial strength, that is, a very high strength along its longitudinal axis such that the container can withstand at least about 1000× g, preferably at least about 4000× g, and most preferably greater than about 5000× g, applied to the interior surface 24 of the bottom wall 16.

The one or more side walls 18 of container 12 can be translucent or transparent so as to allow the user to readily recognize the height of the liquid material within the container 12. In such embodiments, the one or more side walls 18 can also be graduated with volume indicating markers.

The embodiment illustrated in the drawings has a generally oval cross-section, having a first transverse axis 26 and a second transverse axis 28 disposed substantially perpendicular to the first transverse axis 26. The first transverse axis 26 can be of the same length as the second transverse axis 28. In the embodiment illustrated in the drawings, the first transverse axis 26 is longer than the second transverse axis 28. In all cases, it is preferred that both the first and second transverse axes 26 and 28 be at least about 9 cm in length to facilitate the removal of a pellet on the bottom wall 16 of the container 12.

The interior chamber 20 of the container 12 has an interior chamber cross-sectional area and the top opening 22 defines a top opening area. The top opening area is at least about 90% of the interior chamber cross-sectional area. In the embodiment illustrated in the drawings, the top opening 22 is defined by a circumferential rim 30 running along the uppermost portions of the one or more sidewalls 18. In this embodiment, the top open area is essentially the same as the interior chamber cross-sectional area.

Figure 8:
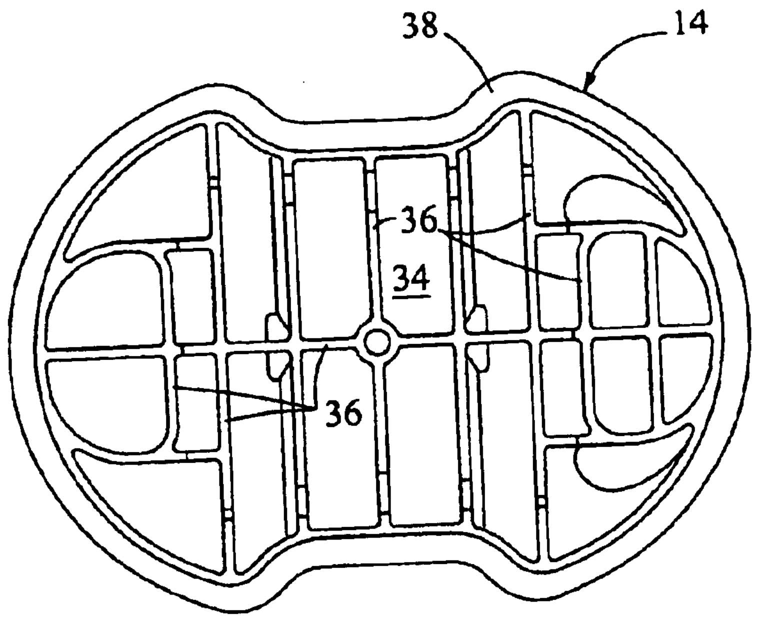
FIG. 8 is a bottom view of the lid portion of the labware illustrated in FIG. 1.

In the embodiment illustrated in the drawings, the cross-section of the container 12 is "pinched" at the second transverse axis 28, so as to give the cross-section somewhat of a "figure 8" shape. This shape facilitates the attachment of the lid 14 across the top opening 22 of the container 12. Because of this figure 8 shaped cross-section, the meniscus of liquid being centrifuged within the container 12 rises to a greater extent along the one or more side walls 18 at the second transverse axis 28. To prevent the meniscus from rising above the circumferential rim 30, the one or more side walls 18 proximate to the second transverse axis 28 are curved upwardly so that the height of the one or more side walls 18 proximate to the second transverse axis 28 is slightly higher in elevation than the remainder of the one or more side walls 18.

The lid 14 is a removable, non-threaded structure having an exterior surface 32, an interior surface 34 and a very high axial strength. By "very high axial strength," it is meant that the lid 14 can withstand axial forces of at least about 1000× g, preferably at least about 4000× g, and most preferably 5000× g, applied to the exterior surface 32 of the lid 14. The lid 14 is sized and dimensioned to cover the top opening 22 so as to seal the interior chamber 20 of the container 12.

In the embodiment illustrated in the drawings, the interior surface 34 of the lid 14 comprises a plurality of interconnecting reenforcement ribs 36 which cooperate to provide the lid 14 with its very high axial strength.

Figure 7:
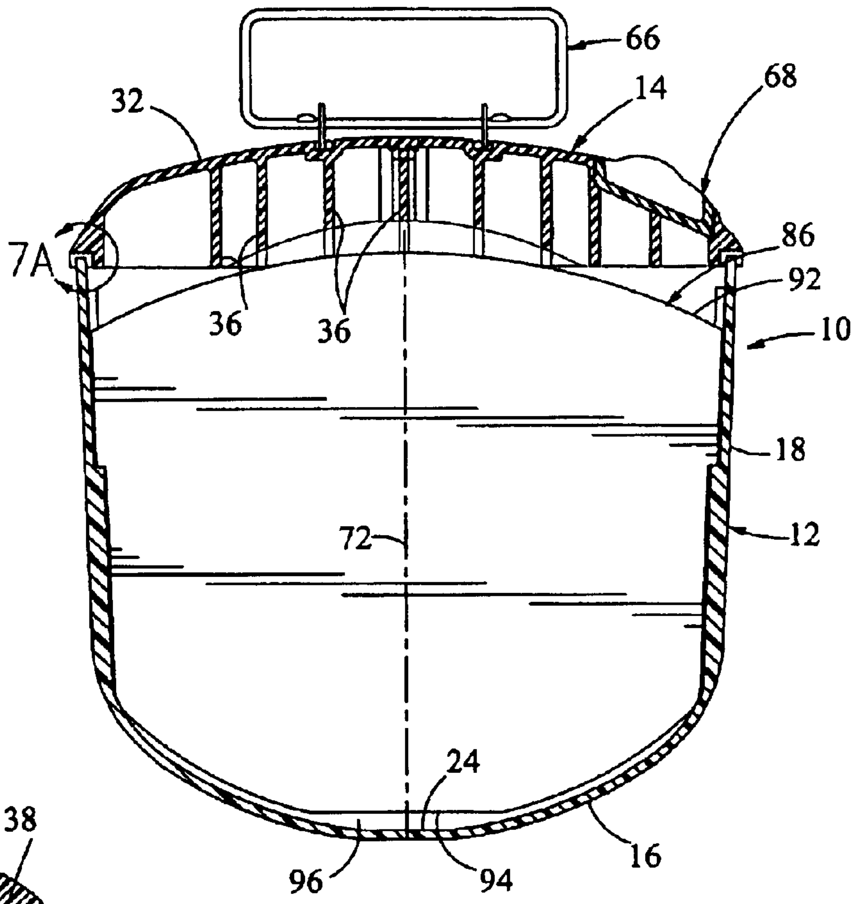
FIG. 7 is a half section view of the labware illustrated in FIG. 1.
Figure 7A:
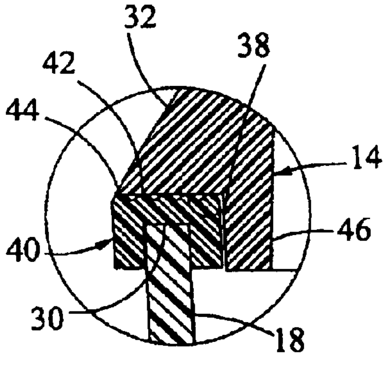
FIG. 7A is a detailed view of one edge of the labware illustrated in FIG. 7.

In the embodiment illustrated in the drawings, the interior surface 34 of the lid 14 also has a circumferential horizontal lid flange 38 with a width of at least about 3 mm, preferably at least about 5 mm. The horizontal lid flange 38 is sized and dimensioned to match with the circumferential rim 30 of the container 12 so that the lid 14 tightly seals the top opening 22 of the container 12. To facilitate this seal, a gasket 40 is preferably disposed between the circumferential rim 30 and the horizontal lid flange 38. As illustrated in FIG. 7A, the top surface 42 of the gasket 40 preferably defines a plurality of parallel ribs 44 which provide the top surface 42 of the gasket 40 with a tortuous path. Such tortuous path acts to enhance the seal between the lid 14 and the container 12 and minimizes any change of the liquid leaking or "aerosoling" from the labware 10 during use. The gasket 40 can be made from a silicone.

Preferably, the lid 14 further comprises a circumferential vertical lid flange 46 which is disposed downwardly below the horizontal lid flange 38 by a distance of at least about 3 mm, preferably at least about 5 mm. The vertical lid flange 46 is sized and dimensioned to be spaced apart from the circumferential rim 30 of the container 12 by at least about 1 mm. In embodiments having the vertical lid flange 46, the seal between the lid 14 and the circumferential rim 30 is maintained even under extreme centrifuge conditions wherein the one or more side walls 18 of the container 12 expands and the top opening 22 of the container 12 distorts.

In the embodiment illustrated in the drawings, the lid 14 is readily attached and deattached from the container 12 by a hinged wire clip 48 having a pair of opposed attachment prongs 50. The attachment prongs 50 engage corresponding attachment apertures 52 (see FIG. 3A) defined within a hinge support post 54 which is disposed near the top of the one or more side walls 18 of the container 12. In operation, the clip 48 nests within parallel clip grooves 56 defined within the exterior surface 32 of the lid 14 to minimize aerodynamic drag on the clip 48. The clip 48 further comprises a horizontal catch member 58 which is reversibly retained within a retaining groove 60 disposed within a catch post 62. The catch post 62 is disposed near the upper portion of the one or more sidewalls 18 of the container 12 opposite to the catch post 54 (see FIG. 3B). The catch member 58 can be easily disengaged from the retaining groove 60 by pulling outwardly on a finger loop member 64.

As illustrated in FIG. 4, a carrying handle 66 is rotatably attached to the hinged clip 48 to facilitate the carrying of the labware 10. The handle 66 is rotatably attached to the clip 48 so that it can fold against the exterior surface 32 of the lid 14 during operation, thereby minimizing aerodynamic drag on the handle 66. Both the clip 48 and the handle 66 can be made from a stainless steel wire.

The lid 14 can also further comprise a pouring spout 68 to facilitate the safe offloading of liquid from the fermentors to the labware 10 using a hose. Such offloading using a hose minimizes the danger of inadvertent splash back. The pouring spout 68 also facilitates the decanting of liquid material from the container 12 after centrifuging. The pouring spout 68 preferably comprises a removable self-sealing pouring spout cover 70. By "self-sealing," it is meant that the pouring spout cover 70 tends to seal itself when the labware 10 is being rotated in a centrifuge. In the embodiment illustrated in the drawings, the pouring spout cover 70 is adapted to press fit into the pouring spout 68 along a path which is parallel to the longitudinal axis 72 of the container. Such self-sealing configuration minimizes the danger of liquid leakage or aerosoling during operation.

Figure 9:
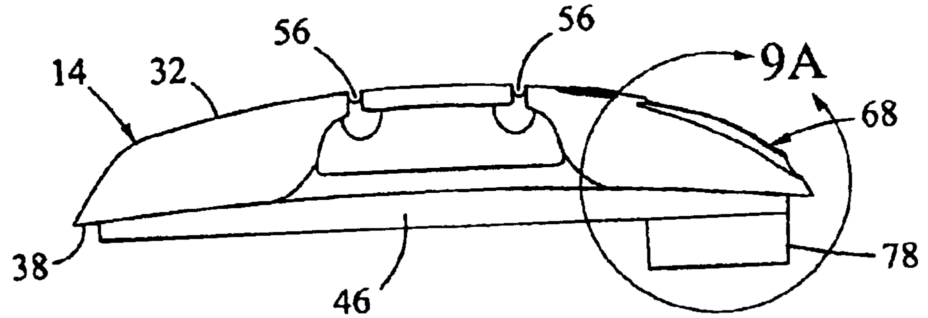
FIG. 9 is a side view of the lid portion of the labware illustrated in FIG. 8.
Figure 9A:
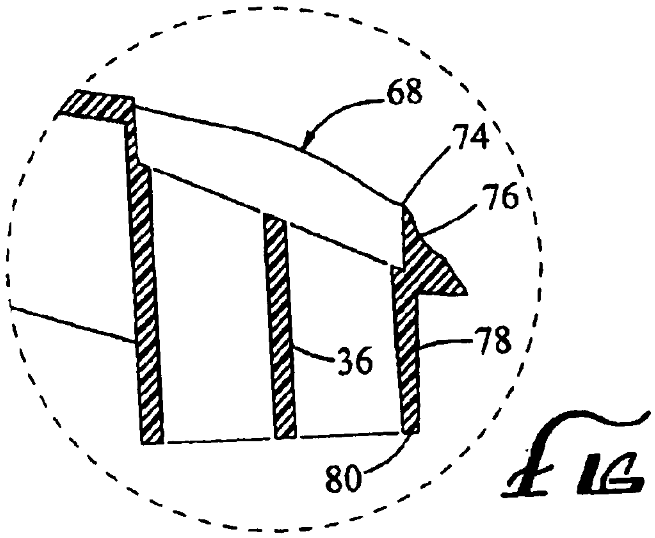
FIG. 9A is a cross-sectional detail view of the spout portion of the lid illustrated in FIG. 9.
Figure 10:
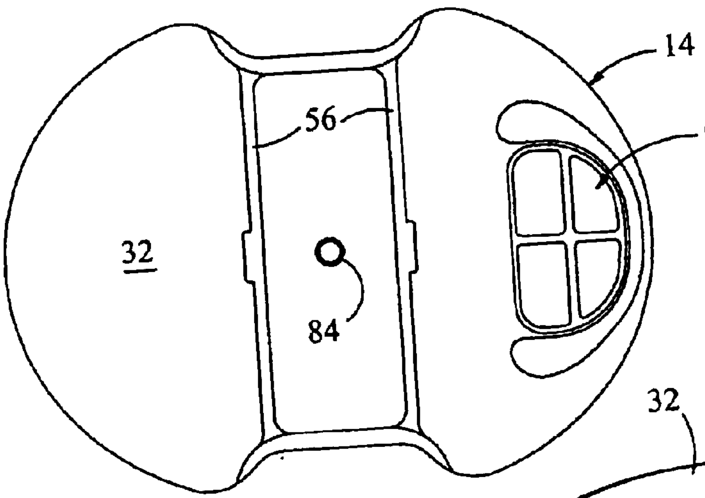
FIG. 10 is a plan view of the lid portion illustrated in FIG. 8.
Figure 11:
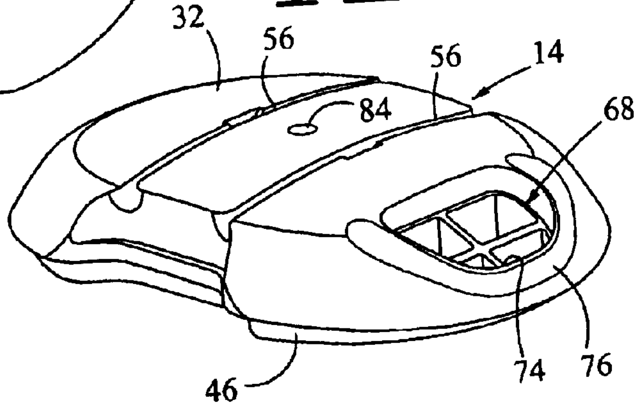
FIG. 11 is a perspective view of the lid portion illustrated in FIG. 8.
Figure 12:
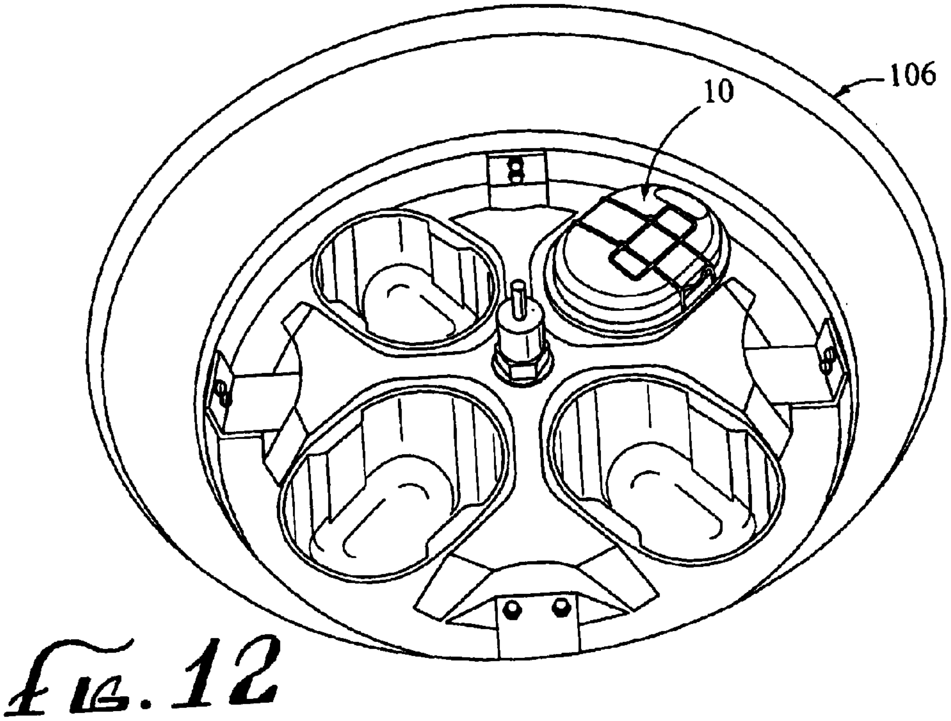
FIG. 12 is a perspective view of a centrifuge where in is disposed the labware illustrated in FIG. 1.

Preferably, the pouring spout 68 has a sharp forward edge 74 as illustrated in FIG. 9A so that the decanting of liquid from the container to the pouring spout is drool free and is substantially drip-free. As illustrated in FIGS. 9A and 11, a circular trough-like depression 76 surrounds about three quarters of the periphery of the spout to create the sharp edge 74.

It is also preferable that the pouring spout 68 has a downwardly directed portion 78 which extends below the circumferential horizontal lid flange 38. The downwardly directed portion 78 facilitates the loading of the container 12 through the pouring spout 68 by providing the user with a convenient "sight glass" to recognize when the liquid level within the container 12 is approaching the upper edges of the one or more container side walls 18 by noting the formation of a meniscus-shaped fluid surface at the lowermost part 80 of the downwardly directed portion 78.

The downwardly directed portion 78 also prevents the overfilling of the container 12 through the pouring spout 68. Once the liquid level within the container 12 reaches the lowermost part 80 of the downwardly directed portion 78, additional liquid delivered into the pouring spout 68 is prevented from entering the interior chamber 20 by the trapped air mass disposed immediately below the lid 14. Excess liquid delivered into the spout 68 merely backs up into the spout 68 but does not enter the interior chamber 20. This is generally true even in embodiments having an air vent aperture in the lid 14 as described in the next paragraph.

To facilitate the filling and decanting of liquid material to and from the container 12 through the pouring spout 68, the lid 14 preferably further comprises an air vent filter 82. The air vent filter 82 can be a polypropylene plug having a slight taper in the longitudinal direction so as to provide a slight interference fit with a corresponding air vent aperture 84 in the lid. Preferably, the air vent filter 82 is recessed within the lid 14 to minimize aerodynamic drag.

The lid 14 is typically molded from a high strength thermoplastic, such as a polyphenylsulfone. Like in the container 12, a suitable polyphenylsulfone useable in the molding of the lid 14 is Radel R1000.

In the embodiment illustrated in the drawings, the exterior surface 32 of the lid 14 is generally smooth (except for the clip grooves 56) so that a substantial portion of the exterior surface 32 of the lid 14 can be used as a writing surface for labware or sample identification.

A planar structural support 86 can be optionally used to provide the container 12 with additional axial support during centrifuging. Use of this structural support 86 also acts as a vortex breaker and to hold a container liner in place. The structural support 86 can be made from a thermoplastic, such as polyetherimide. A suitable polyetherimide is Ultem 1000 marketed by GE Plastics of Pittsfield, Mass.

The structural support 86 can be conveniently inserted and removed from the container 12 by slipping the longitudinal support into a pair of opposed first structural support slots 88 disposed on opposite sides of the interior surface 90 of the one or more vertical side walls 18 of the container 12, along the first transverse axis 26.

In the embodiment illustrated in the drawings, the structural support 86 is curved upwardly along its uppermost edge 92. The lowermost edge 94 of the structural support 86 is spaced apart from the bottom wall 16 of the container 12 to form a clearance gap 96, so that a pellet can be formed along the bottom wall 16 of the container 12 without contacting the structural support 86.

In the embodiment illustrated in the drawings, a pair of second structural support slots 98 are disposed on the interior surface 90 of the container 12 along the second transverse axis 28. Such second structural support slots 98 can be used to retain a second planar structural support (not shown) disposed perpendicular to the first structural support 86. Cooperation of the first structural support 86 and the second structural support can be used to segregate the interior chamber 20 of the container 12 into four separate subchambers.

The drawings also illustrate the use of an optional liner 100. The liner 100 is sized and dimensioned to closely follow the contours of the interior surfaces of the container walls 16 and 18. Preferably, the liner 100 can be inserted and removed from the container 12 by hand without use of special tools. The liner 100 can be any suitable flexible or semi-rigid material which supports samples or other fluids. The liner 100 can be made from a low density polyethylene. Liners 100 useable in the invention can be of the type described in U.S. patent application Ser. No. 09/607,232, filed Jun. 30, 2000 under the title "Removable Conformal Liners for Centrifuge Containers," the entirety of which is incorporated herein by this reference.

In the embodiment illustrated in the drawings, the liner 100 has one or more vertical side walls 102 which terminate in an outwardly directed circumferential horizontal liner flange 104. In this design, the circumferential horizontal liner flange 104 is assembled within the labware 10 of the invention between the circumferential rim 30 of the container and the circumferential horizontal lid flange 38. Because the horizontal liner flange 104 is "sandwiched" between the circumferential rim 30 and the horizontal lid flange 38, the liner 100 is held firmly in place and is prevented from folding over on itself.

The labware of the invention can be conveniently used in a wide variety of centrifuges 106, such as the Avanti J and J2 family of centrifuges marketed by Beckman Coulter, Inc., of Fullerton, Calif.

EXAMPLE

In one embodiment of the invention, the container 12 has a first transverse axis 26 measuring 177.8 mm and a second transverse axis 28 measuring 137.2 mm. The overall height of the container 12 is 168.7 mm. The bottom wall 16 of the container 12 has a radius of curvature of 115.1 mm. The upper portions 108 of the one or more side walls 18 at the second transverse axis 28 have a radius of curvature of 821.2 mm. The exterior surface 32 of the lid 14 has a radius of curvature of 254.0 mm. The overall height of the labware 10 is 204.7 mm. The design volume of the labware 10 is 2.25 liters. Both the container 12 and the lid 14 are made from polyphenylsulfone. The hinged clip 48 and the handle 66 are made from stainless steel. The structural support 86 is made from polyetherimide. The liner 100 is made from low density polyethylene. The gasket 40 is made from food grade silicone and the air vent filter 82 is made from polypropylene. This embodiment is designed for use in an Avanti J-HC Centrifuge and JS-5.0 rotor.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A centrifuge labware device comprising:

(a) a container having very high axial strength, the container comprising a bottom wall and one or more substantially vertical sidewalls, the bottom wall and the one or more side walls cooperating to define an interior chamber having an interior chamber cross-sectional area, the container having a top opening with a first transverse axis and a second transverse axis substantially perpendicular to the first transverse axis, each transverse axis being at least about 9 cm in length, the top opening defining a top opening open area which is at least about 90% of the interior chamber cross-sectional area;

(b) a removable non-threaded lid having an exterior surface, an interior surface and a very high axial strength, the lid being sized and dimensioned to cover the top opening so as to seal the interior chamber; and (c) a clip for securing the lid to the container.

2. The centrifuge labware device of claim 1 wherein the bottom wall of the container has an interior side, wherein the container has sufficient strength to withstand the force of 5000× g applied to the interior side of the bottom wall and wherein the lid has sufficient strength to withstand the force of 5000× g applied to the exterior side of the lid.

3. The centrifuge labware device of claim 1 further comprising a carrying handle.

4. The centrifuge labware device of claim 1 wherein the interior surface of the lid has a circumferential horizontal lid flange with a width of at least about 3 mm.

5. The centrifuge labware device of claim 4 wherein the interior surface of the lid further comprises a circumferential vertical lid flange disposed interior to the circumferential horizontal lid flange, the vertical lid flange being disposed downwardly below the horizontal lid flange by a distance of at least about 3 mm.

6. The centrifuge labware device of claim 5 wherein the vertical lid flange is sized and dimensioned to be spaced-apart from the circumferential rim of the container by at least about 1 mm.

7. The centrifuge labware device of claim 4 wherein the top opening of the container is defined by a circumferential rim which matches with the circumferential horizontal lid flange and wherein a gasket is disposed between the circumferential rim and the circumferential horizontal lid flange.

8. The centrifuge labware device of claim 1 further comprising a liner disposed within the container, the liner being sized and dimensioned to closely fit against the walls of the container.

9. The centrifuge labware device of claim 8 wherein the interior surface of the lid has a circumferential horizontal lid flange, wherein the top opening of the container is defined by a circumferential rim which corresponds to matches the circumferential horizontal lid flange, wherein the liner has one or more vertical side walls which terminate in an outwardly directed circumferential horizontal liner flange and wherein the circumferential horizontal liner flange is disposed between the circumferential rim of the container and the circumferential horizontal lid flange.

10. The centrifuge labware device of claim 1 wherein the one or more side walls of the container have an exterior surface and an interior surface, the interior surface of the one or more side walls comprising a pair of opposed first structural support slots.

11. The centrifuge labware device of claim 10 further comprising a planar support member disposed within the first structural support slots.

12. The centrifuge labware device of claim 11 further comprising a pair of second structural support slots disposed on the interior surface of the container, spaced apart from the first structural support slots.

13. The centrifuge labware device of claim 1 wherein the interior surface of the bottom wall is bowl-shaped and wherein the transition of the bottom wall to the one or more side walls is smooth and defines no corners or edges.

14. The centrifuge labware device of claim 1 further comprising an air vent filter disposed within the lid.

15. The centrifuge labware device of claim 1 wherein the one or more side walls are translucent or transparent.

16. The centrifuge labware device of claim 1 wherein the centrifuge labware device is disposed within a centrifuge.

17. A method for centrifuging a sample comprising:

obtaining the centrifuge labware of claim 1;

placing the sample in the container;

securing the lid to the container using the clip; and placing the container in a centrifuge.

18. A centrifuge labware device comprising:

(a) a container having very high axial strength, the container comprising a bottom wall and one or more substantially vertical sidewalls, the bottom wall and the one or more side walls cooperating to define an interior chamber having an interior chamber cross-sectional area, the container having a top opening with a first transverse axis and a second transverse axis substantially perpendicular to the first transverse axis, each transverse axis being at least about 9 cm in length, the top opening defining a top opening open area which is at least about 90% of the interior chamber cross-sectional area;

(b) a removable non-threaded lid having an exterior surface, an interior surface and a very high axial strengths the lid being sized and dimensioned to cover the top opening so as to seal the interior chamber; and (c) a hinged clip for securing the lid to the container.

19. The centrifuge labware device of claim 18 wherein the hinged clip is recessed within one or more grooves disposed in the exterior surface of the lid.

20. The A centrifuge labware device comprising:

(a) a container having very high axial strength, the container comprising a bottom wall and one or more substantially vertical sidewalls, the bottom wall and the one or more side walls cooperating to define an interior chamber having an interior chamber cross-sectional area, the container having a top opening with a first transverse axis and a second transverse axis substantially perpendicular to the first transverse axis, each transverse axis being at least about 9 cm in length, the toy opening defining a top opening open area which is at least about 90% of the interior chamber cross-sectional area;

(b) a removable non-threaded lid having an exterior surface, an interior surface and a very high axial strength, the lid being sized and dimensioned to cover the top opening so as to seal the interior chamber; and (c) a pouring spout in the lid, the pouring spout having a removable self-sealing pouring spout cover.

21. The centrifuge labware device of claim 20 wherein the pouring spout has a sharp forward edge so that the decanting of liquid from the container through the pouring spout is substantially drip-free.

22. A centrifuge labware device comprising:

(a) a container having very high axial strength, the container comprising a bottom wall and one or more substantially vertical sidewalls, the bottom wall and the one or more side walls cooperating to define an interior chamber having an interior chamber cross-sectional area, the container having a top opening with a first transverse axis and a second transverse axis substantially perpendicular to the first transverse axis, each transverse axis being at least about 9 cm in length, the top opening defining a toy opening open area which is at least about 90% of the interior chamber cross-sectional area;

(b) a removable non-threaded lid having an exterior surface, an interior surface and a very high axial strength, the lid being sized and dimensioned to cover the top opening so as to seal the interior chamber;

wherein the interior surface of the lid has a circumferential horizontal lid flange with a width of at least about 3 mm; and wherein the lid further comprises a pouring spout and wherein the pouring spout has a downwardly directed portion which extends downwardly below the circumferential horizontal lid flange.

23. A centrifuge labware device comprising:

(a) a container having very high axial strength, the container comprising a bottom wall and one or more substantially vertical sidewalls, the bottom wall and the one or more side walls cooperating to define an interior chamber having an interior chamber cross-sectional area, the container having a toy opening with a first transverse axis and a second transverse axis substantially perpendicular to the first transverse axis, each transverse axis being at least about 9 cm in length, the top opening defining a top opening open area which is at least about 90% of the interior chamber cross-sectional area; and (b) a removable non-threaded lid having an exterior surface, an interior surface and a very high axial strength, the lid being sized and dimensioned to cover the top opening so as to seal the interior chamber;

wherein the interior surface of the lid has a circumferential horizontal lid flange with a width of at least about 3 mm;

wherein the too opening of the container is defined by a circumferential rim which matches with the circumferential horizontal lid flange and wherein a gasket is disposed between the circumferential rim and the circumferential horizontal lid flange; and wherein the gasket has an upper surface which defines a tortuous path.

24. A centrifuge labware device comprising:

(a) a container having very high axial strength, the container comprising a bottom wall and one or more substantially vertical sidewalls, the bottom wall and the one or more side walls cooperating to define an interior chamber having an interior chamber cross-sectional area, the container having a too opening with a first transverse axis and a second transverse axis substantially perpendicular to the first transverse axis, each transverse axis being at least about 9 cm in length, the too opening defining a top opening open area which is at least about 90% of the interior chamber cross-sectional area; and (b) a removable non-threaded lid having an exterior surface, an interior surface and a very high axial strength, the lid being sized and dimensioned to cover the too opening so as to seal the interior chamber;

wherein the interior surface of the lid has a circumferential horizontal lid flange with a width of at least about 3 mm;

wherein the too opening of the container is defined by a circumferential rim which matches with the circumferential horizontal lid flange and wherein a gasket is disposed between the circumferential rim and the circumferential horizontal lid flange; and wherein the first transverse axis is longer than the second transverse axis and wherein the side walls of the container along the second transverse axis are higher in elevation than the side walls along the first transverse axis.

25. A centrifuge labware device comprising:

(a) a container having very high axial strength, the container comprising a bottom wall and one or more substantially vertical sidewalls, the bottom wall and the one or more side walls cooperating to define an interior chamber, the uppermost portions of the side, walls terminating in a circumferential rim which defines, a top opening for the container, the container further having a first transverse axis and a second transverse axis substantially perpendicular to the first transverse axis, each transverse axis being at least about 9 cm in length;

(b) a removable non-threaded lid having an exterior surface, an interior surface and a very high axial strength, the lid being sized and dimensioned to cover the top opening so as to seal the interior chamber, the lid comprising a pouring spout having a removable self-sealing cover, a circumferential horizontal lid flange which matches with the circumferential rim of the container and a circumferential vertical lid flange disposed interior to the circumferential horizontal lid flange, the vertical lid flange being disposed downwardly below the horizontal lid flange by a distance of at least about 3 mm; and (c) a gasket disposed between the circumferential rim and the circumferential horizontal lid flange.

* * * * *